Nov. 6, 1956    C. SYKES ET AL    2,769,227
WELDED JOINT BETWEEN FERRITIC AND AUSTENITIC STEEL MEMBERS
Filed Nov. 28, 1951

Inventors
Charles Sykes &
Henry William Kirkby

United States Patent Office 2,769,227
Patented Nov. 6, 1956

2,769,227

WELDED JOINT BETWEEN FERRITIC AND AUSTENITIC STEEL MEMBERS

Charles Sykes and Henry William Kirkby, Sheffield, England, assignors to Thos. Firth & John Brown Limited, Sheffield, England, a British company Application November 28, 1951, Serial No. 258,761

Claims priority, application Great Britain March 6, 1951

7 Claims. (Cl. 29—196.1)

This invention relates to the joining of metallic members having different coefficients of thermal expansion. The joining of two metallic members, in particular of ferrous materials, having different coefficients of expansion—as in the case of certain austenitic and ferritic steels—where the joint is to work at elevated temperatures and under fluctuating conditions, presents a serious design problem, whether the joint is made by welding, or as a bolted flange or the like.

Differences in expansion characteristics, as for example, when most types of austenitic steel are joined to ferritic steels, result in high stresses when the temperature of the joint is varied. Under fluctuations of temperature, the joint is subjected to fatigue conditions and with a wide range of temperature, failure at the joint may ultimately ensue. This is particularly true of a welded joint since between the ferritic and austenitic portions there is a sharp line of demarkation at which the high stress is concentrated.

One method of avoiding the above drawback is to prevent cycling, i. e., temperature fluctuation, by the use of special heaters which maintain the joint at a reasonably constant temperature. Another method, applicable to a bolted flange, is to design the joint so that the difference in expansion tightens the joint as the temperature is raised.

Broadly stated, the present invention provides, in the making of a joint between two metallic members having different coefficients of thermal expansion, a method of reducing the stresses normally resulting from elevated and fluctuating temperature conditions, which consists in interposing between the members of the joint a metallic buffer layer or layers having thermal expansion characteristics intermediate between those of the main joint members.

More particularly, the invention is concerned with effecting joints between components formed of normal ferritic steels and the higher expansion austenitic steels, and for the purpose of reducing the highly localised stresses already referred to, the invention utilises for the aforesaid buffer layer or layers, several special austenitic steels having varying expansion properties intermediate between those of the main components.

Three examples of structures embodying the invention are shown in the accompanying drawings in which.

Figure 1:
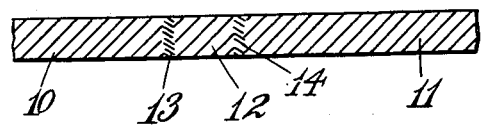
Figure 1 is a sectional view of one embodiment.
Figure 2:
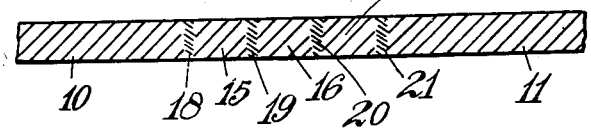
Figure 2 is a sectional view of another embodiment.

In the example shown in Figure 1, the invention is applied to a welded joint between two components 10, 11. The component 10 is a normal ferritic steel having a coefficient of expansion of approximately 0.000014 and the component 11 is a normal austenitic steel having a coefficient of expansion of approximately 0.000018. In carrying out the invention a buffer component 12 in the form of a special austenitic steel having a coefficient of expansion of 0.000016 is sandwiched between the two main components 10, 11, the normal ferritic steel 10 being welded at 13 to the buffer component 12 and the latter in turn welded at 14 to the normal austenitic steel 11. In this way the stress at each weld, for a given change in temperature is reduced to 50% of that which would obtain with a direct joint between the two main components. Further reductions in the localised stress at the welded joint may be obtained by further subdividing the jointing of the normal ferritic and austenitic steels with additional buffer components comprising other special austenitic steels having intermediate expansion properties. There may be, for example as shown in Figure 2, three buffer components 15, 16, 17 having expansion coefficients of 0.000015, 0.000016 and 0.000017 respectively, the weld being effected 18 from the normal ferritic steel 10 (coefficient 0.000014) and at 19, 20, 21 through the three buffer components successively to the normal austenitic steel 11 (coefficient 0.000018). By this means the stress at each of the four welds will be reduced to 25% of the stress at a direct joint between the main components.

Figure 3:
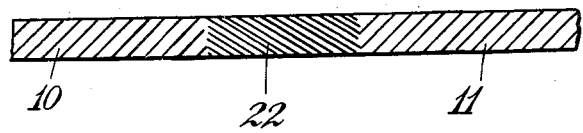
Figure 3 is a sectional view of a third embodiment.

In an alternate method according to the invention a welded joint, as illustrated in Figure 3, between metallic components having different thermal expansion characteristics is made with weld metals whereof the composition gradually changes throughout its depth to provide a progressive variation in expansion coefficient from that of one of the main components to that of the other. In applying this method to a welded joint between a normal ferritic steel 10 (coefficient 0.000014) and a normal higher expansion austenitic steel (coefficient 0.000018) the weld metal 22 has a composition which varies throughout its depth to provide a progressive variation in expansion coefficient from 0.000014 to 0.000018.

In carrying out the invention the following types of alloys having the necessary terminal and intermediate expansion characteristics may for example be employed.

| Alloy No. | Carbon | Chromium | Nickel | Cobalt | Niobium | Expansion |
|---|---|---|---|---|---|---|
| 1 | 0.14 | 10-15 | 30-40 | 10-20 | 1.3 | 0.000014 |
| 2 | 0.14 | 10-15 | 30-40 | 5-10 | 1.3 | 0.000015 |
| 3 | 0.14 | 10-15 | 30-40 | nil | 1.3 | 0.000016 |
| 4 | 0.14 | 10-15 | 20-25 | nil | 1.3 | 0.000017 |
| 5 | 0.14 | 10-15 | 14-18 | nil | 1.3 | 0.000018 |

It will be clear that different alloys may be required depending upon the range of temperature under consideration.

In the examples shown in the drawings, the buffer, or intermediate, component 12 is of alloy No. 3, and the welds 13, 14 are made with weld metal of that alloy. The buffer, or intermediate components 15, 16 and 17 are respectively of alloys Nos. 2, 3 and 4, and the welds 18, 19, 20, 21 are made with alloys Nos. 2, 3, 4, and 5 respectively. The weld metal 22 is made up by depositing successive layers of alloys Nos. 1, 2, 3 and 4 by welding.

The austenitic component 11 may be any well-known austenitic alloy steel having a coefficient of expansion of 0.000018. The ferritic component 10 may be of any well-known ferritic steel having a coefficient of expansion of 0.000014.

Throughout this specification the coefficient of expansion values are mean values over the range 20° C. to 550° C. and on the basis of inch per inch per degree centigrade.

We claim:

1. A welded joint between a ferritic steel structural member of relatively low cofficient of thermal expansion and an austenitic steel structural member of relatively high coefficient of thermal expansion comprising, in combination with said members, a plurality of intermediate weld metal layers of austenitic steels, said intermediate layers having respectively coefficients of thermal expansion which are different from one another and are different from and between the said coefficients of the said ferritic and austenitic steel members and which successively increase from each intermediate layer to the next through the thickness of the joint, the intermediate layer having the lowest coefficient being adjacent to the ferritic steel member and the intermediate layer having the highest coefficient being adjacent to the austenitic steel member, said intermediate layers being selected from the following group of special austenitic steels: carbon 0.14%, chromium 10–15%, nickel 30–40%, cobalt 10 to 20%, niobium 1.3%, thermal expansion coefficient 0.000014; carbon 0.14% chromium 10–15%, nickel 30–40%, cobalt 5 to 10%, niobium 1.3%, thermal expansion coefficient 0.000015; carbon 0.14%, chromium 10–15%, nickel 30–40%, niobium 1.3%, thermal coefficient 0.000016; and carbon 0.14%, chromium 10–15%, nickel 20–24%, niobium 1.3% thermal expansion coefficient 0.000017; and carbon 0.14%, chromium 10–15%, nickel 14–18%, niobium 1.3% thermal expansion coefficient 0.000018.

2. A welded joint structure comprising a first structural member of a ferritic steel having a thermal coefficient of expansion of 0.000014, a second structural member of an austenitic steel having a thermal coefficient of expansion of 0.000018, and an intermediate rigid component layer directly sandwiched between said first and second structural members and in welded fixture therewith forming a joint varying progressively in thermal expansion properties from the ferritic member to the austenitic member, said intermediate component layer having substantially the following composition: carbon 0.14, chromium 10–15%, nickel 30–40%, niobium 1.3%, and having a thermal coefficient of expansion of 0.000016.

3. A welded joint structure comprising a first structural member of a ferritic steel having a thermal coefficient of expansion of 0.000014, a second structural member of an austenitic steel having a thermal coefficient of expansion of 0.000018 and a plurality of intermediate rigid component layers of austenitic steel directly sandwiched between said first and second structural members and positioned successively from one structural member to the other with the intermediate layers in direct contact and in welded fixture with the structural members and with each other where they contact, said intermediate layers having thermal coefficients of expansion which increase in successively substantially equal steps from the said coefficient of the first structural member to that of the second structural member.

4. A welded joint structure according to claim 3, wherein said intermediate layers are selected from the following group of special austenitic steels: carbon 0.14%, chromium 10–15%, nickel 30–40%, cobalt 10 to 20%, niobium 1.3% thermal expansion coefficient 0.000014; carbon 0.14%, chromium 10–15%, nickel 30–40%, cobalt 5 to 10%, niobium 1.3%, thermal expansion coefficient 0.000015; carbon 0.14%, chromium 10–15%, nickel 30–40%, niobium 1.3%, thermal expansion coefficient 0.000016; carbon 0.14%, chromium 10–15%, nickel 20–25%, niobium 1.3%, thermal expansion coefficient 0.000017; and carbon 0.14%, chromium 10–15%, nickel 14–18%, niobium 1.3% thermal expansion coefficient 0.000018.

5. A welded joint structure according to claim 4, wherein said intermediate layers are three in number and have thermal expansion coefficients of 0.000015, 0.000016 and 0.000017 respectively.

6. Metallic components comprising one formed of a normal ferritic steel having a coefficient of expansion of approximately 0.000014 and another formed of a normal austenitic steel having a coefficient of thermal expansion of approximately 0.000018, united by a welded joint in the form of weld metals consisting of austenitic steels free from sigma phase having expansion properties progressively varying from the ferritic steel of low coefficient of expansion to the austenitic steel of higher coefficient of expansion.

7. Metallic components according to claim 6 wherein the weld metals have a composition which varies from the ferritic component to the austenitic component to provide a progressive variation in expansion coefficient from 0.000014 to 0.000018, the weld metal consisting of at least some of the following group of austenitic steels: carbon 0.14%, chromium 10–15%, nickel 30–40%, cobalt 10 to 20%, niobium 1.3%, thermal expansion coefficient 0.000014; carbon 0.14%, chromium 10–15%, nickel 30–40%, cobalt 5–10%, niobium 1.3%, thermal expansion coefficient 0.000015; carbon 0.14%, chromium 10–15%, nickel 30–40%, niobium 1.3%, thermal expansion coefficient 0.000016; carbon 0.14%, chromium 10–15%, nickel 20–25%, niobium 1.3%, thermal expansion coefficient 0.000017; and carbon 0.14%, chromium 10–15%, nickel 14–18%, niobium 1.3%, thermal expansion coefficient 0.000018.

References Cited in the file of this patent

UNITED STATES PATENTS

| | | |
|---|---|---|
| 1,613,461 | Johnson | Jan. 4, 1927 |
| 1,835,010 | Burnish | Dec. 8, 1931 |
| 1,870,235 | Bush | Aug. 9, 1932 |
| 1,987,714 | Scott | Jan. 15, 1935 |
| 2,060,765 | Welch | Nov. 10, 1936 |
| 2,095,737 | Gibbs | Oct. 12, 1937 |
| 2,101,970 | Wissler | Dec. 14, 1937 |
| 2,156,298 | Leitner | May 2, 1939 |
| 2,158,799 | Larson | May 16, 1939 |
| 2,200,229 | Strauss | May 7, 1940 |
| 2,232,656 | Davis | Feb. 18, 1941 |
| 2,233,455 | Larson | Mar. 4, 1941 |
| 2,240,824 | Alban | May 6, 1947 |
| 2,470,753 | Alban | May 24, 1949 |

OTHER REFERENCES

Welding Handbook, third edition, pages 670 and 671. Published by American Welding Society, 33 West 39th Street, New York.